June 4, 1929.  H. CROWDER  1,715,536
SELF OILING BOBBING GEAR
Filed July 8, 1927
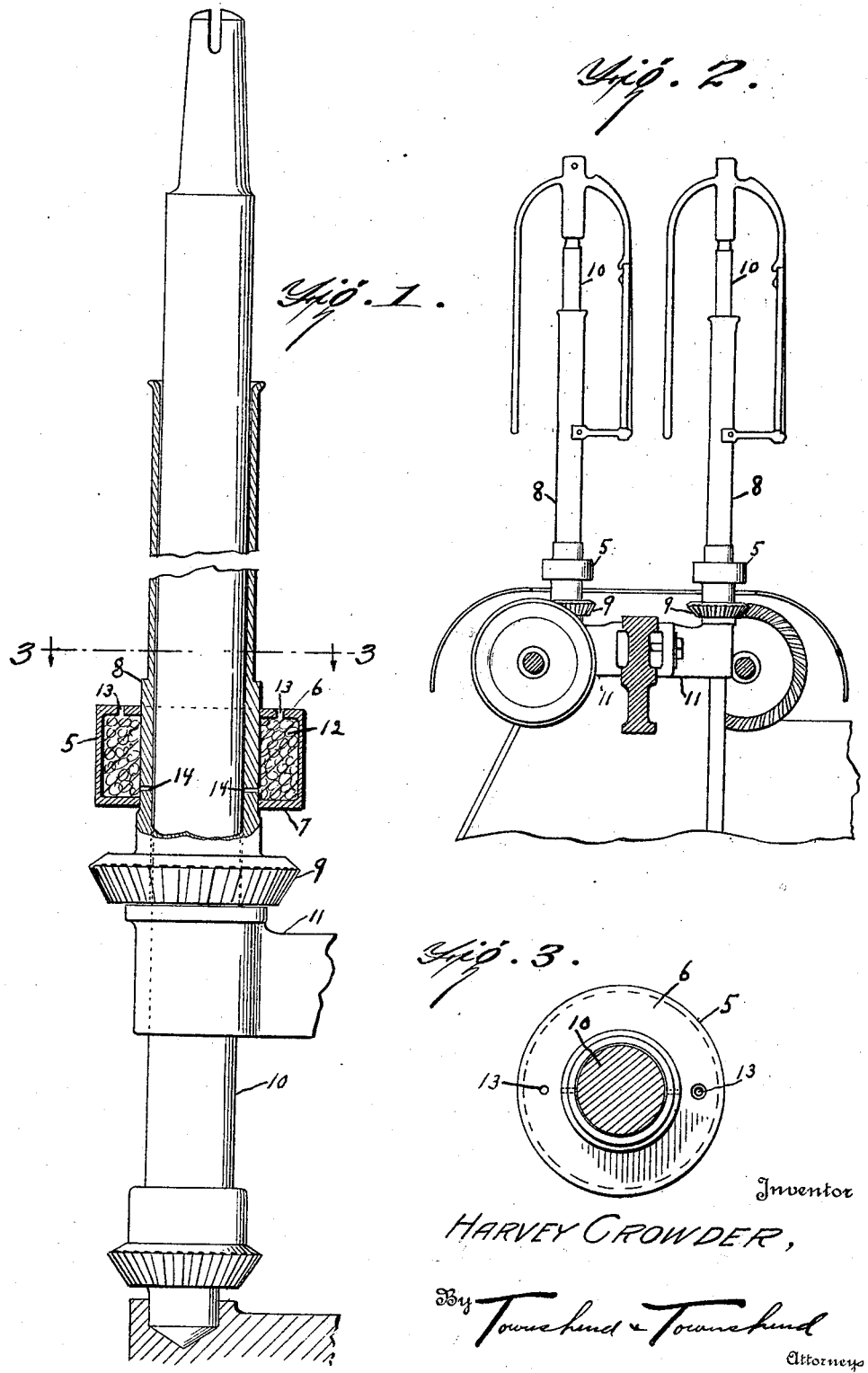

Patented June 4, 1929.

1,715,536

UNITED STATES PATENT OFFICE.

HARVEY CROWDER, OF ALABAMA CITY, ALABAMA, ASSIGNOR OF ONE-HALF TO JAMES LEE BOTSFORD, OF ATTALLA, ALABAMA.

SELF-OILING BOBBING GEAR.

Application filed July 8, 1927. Serial No. 204,214.

This invention relates to gear mechanism in general, and in particular to self oiling means for bobbing gears. Among the objects in view are: to provide an improved sleeve gear formed with self contained lubricating means; to provide a bobbing gear formed for self lubrication and provided with a lubricant containing reservoir formed as a part of the gear; and to provide in a gear of this character, means for the automatic feed of a lubricant thereto.

With these and such other objects in view as will be apparent from the description to those skilled in the art, the invention resides in the novel construction, combination and arrangement of parts hereinafter described and claimed, and illustrated in the accompanying drawings, wherein is shown one practical and physical embodiment of the principles of the invention.

Figure 1 is an elevation, partly in section, of a gear constructed and mounted in accordance with the invention.

Figure 2 is an elevation of a bobbing gear assembly illustrating the gear as in service.

Figure 3 is a horizontal section on the line 3—3 of Figure 1.

In detail the invention comprises a lubricant reservoir in the form of a hollow cylinder 5 having a closed upper end or top 6 and a closed lower end or bottom 7 carried on the hub sleeve 8 of a bobbing gear 9. As in the usual construction of such gears the pinion 9 through its hub sleeve 8 is rotatably mounted in a vertical position on an arbor 10 forming an element of the gear assembly, which general assembly as shown in Figure 2 forms no part of the present invention and is therefore not described, the same being well known to those skilled in the art. The bottom of the pinion gear 9 bears on the usual strut 11, as shown in Figure 1.

The outer wall of the reservoir cylinder 5 is in concentric spaced relation from the hub sleeve 8 and the chamber thus formed is filled with a fibrous material packing 12 having absorptive qualities for holding oil or other liquid lubricant fed into the chamber of the reservoir through feed apertures 13 in the top 6. Adjacent the bottom of the reservoir chamber the hub sleeve 8 is formed with radial bores 14 extending therethrough by means of which the lubricant from the chamber flows by gravity into contact with the arbor 10, thus lubricating the bearing of the hub sleeve on the arbor and by gravity feed, the bearing of the pinion 9 on the strut 11.

While in this embodiment the cylinder 5 is shown as a separate element secured on the hub sleeve 8, it is within the province of the invention that it may be cast as an integral part thereof, and various desired modifications of detail may be made as will fall within the scope of the invention as claimed.

I claim:—

A self oiling gear comprising a pinion having a hub adapted to be disposed in service in a vertical position, a sleeve extendng above the hub from one end thereof and integral therewith, a hollow cylinder surrounding said sleeve and rigidly secured thereto with the walls of said cylinder in concentric spaced relation from said sleeve, said cylinder being closed at its top and bottom, a lubricant holding material disposed in said cylinder, said sleeve being provided with radial conduits disposed slightly above the bottom of said cylinder, and said cylinder having its top provided with perforations to receive a lubricant therethrough, said sleeve conduits being formed for gravitational feed of lubricant from the material in said cylinder to the inner face of said sleeve above said hub.

In testimony whereof I affix my signature.

HARVEY CROWDER.